UNITED STATES PATENT OFFICE.

ADOLPH SOMMER, OF BERKELEY, CALIFORNIA.

SOLUTION OF LACTIC ACID IN OILS AND FATS.

SPECIFICATION forming part of Letters Patent No. 470,714, dated March 15, 1892.

Application filed January 11, 1887. Serial No. 224,052. (No specimens.)

*To all whom it may concern:*

Be it known that I, ADOLPH SOMMER, a citizen of the United States, residing at Berkeley, in the county of Alameda and State of California, have invented new and useful Solutions of Lactic Acid in Oils and Fats; and I do hereby declare that the following is a full and exact description of this invention, which will enable others skilled in chemical manipulations to apply and make the same.

Oils and fats which find application for alimentary and medicinal purposes are frequently so insipid and unpalatable that they prove repulsive to many people. Having found that these bodies under certain conditions and proper treatment dissolve a small amount of concentrated lactic acid I avail myself of this property for the purpose of improving their taste by imparting to them a moderate degree of sourness. Lactic acid as generally found in commerce contains a small amount of water, which renders it insoluble in oils and fats. To make it soluble in these substances it is necessary to remove the water. Most of the water can be removed by careful evaporation on a water or oil bath; but the evaporation must not be carried too far nor the heat raised too high, lest a portion of the lactic acid be converted into lactic anhydride, which has a decidedly bitter taste and would render the acid unfit for use. The evaporation is interrupted when the acid has become sirupy. Although the solubility of the acid in oils and fats is by this partial evaporation of the water materially increased, and it is possible to dissolve a small percentage of this concentrated acid directly in some of the oils, yet for most purposes a still greater degree of dehydration of the acid is necessary. This is brought about by digesting the sirupy acid with the oil or fat in the presence of dehydrating agents in the manner described in a concurrent application, Serial No. 388,709, filed April 13, 1891, and entitled "Process of dissolving lactic acid in oils and fats." For this purpose the sirupy acid is intimately mixed with the oil or fat, which, if not liquid at the prevailing temperature, has been previously liquefied by heat. To this mixture is added a dehydrating agent—such as dry chloride of sodium or anhydrous sulphate of soda—and the whole digested for a considerable time, either at the ordinary or at an elevated temperature. The oils and fats which do not suffer by heat I prefer to submit to the warm digestion, because in the warmth the solution of the lactic acid in the oil or fat is effected quicker than in the cold. When the mixture has become clear and remains clear after cooling, the acidulated oil or fat is decanted, filtered, if necessary, and preserved in air-tight vessels. The quantity of lactic acid which I thus dissolve in the oil or fat depends somewhat on the purpose for which the finished compound is to be used; but for most purposes ten to fifteen parts of sirupy lactic acid to one thousand parts of oil or fat will render the compound sufficiently sour. In the same manner I combine lactic acid with oils and fats which have previously been mixed with benzoic sulphinide, as described in an application for a patent filed April 24, 1886, Serial No. 200,090.

The terms "oils" and "fats," as used and understood in connection with this specification, denominate certain liquid and solid animal and vegetable products, consisting mainly of the glycerides of various organic acids.

Having thus described my invention, what I claim as new, and desire to secure by Letters Patent, is—

The solution of concentrated lactic acid in oils and fats, substantially as described.

ADOLPH SOMMER.

Witnesses:
FRED. A. GRAZER,
PATRICK J. HEALY.